A. W. JOHNSON.
FRUIT PICKER.
APPLICATION FILED MAR. 6, 1914.

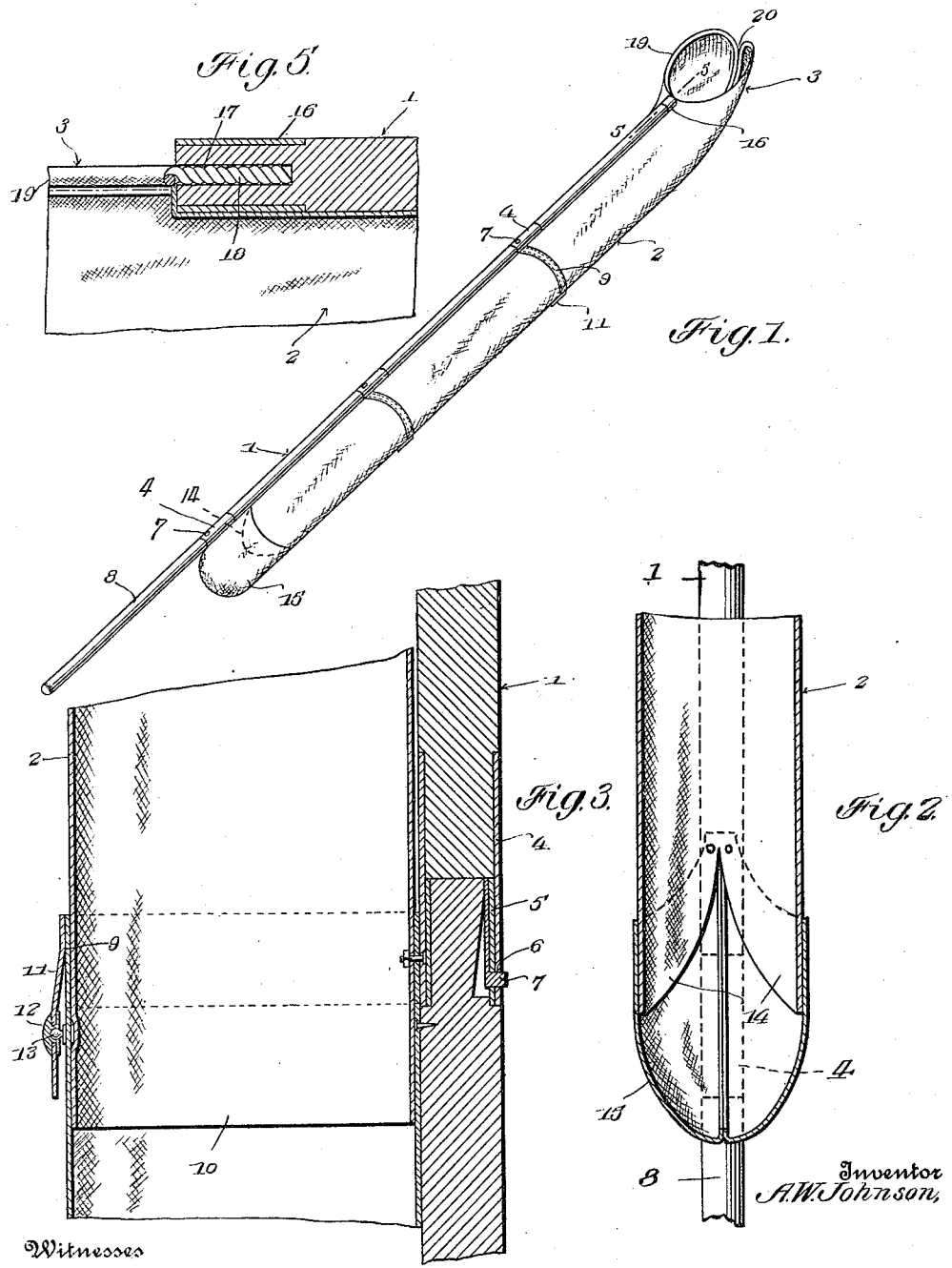

1,134,862.

Patented Apr. 6, 1915.

2 SHEETS—SHEET 2.

Witnesses
J. H. Crawford
Wm. T. North

Inventor
A. W. Johnson,

By Victor J. Evans
Attorney

UNITED STATES PATENT OFFICE.

ALFRED W. JOHNSON, OF CHICAGO, ILLINOIS.

FRUIT-PICKER.

1,134,862.   Specification of Letters Patent.   Patented Apr. 6, 1915.

Application filed March 6, 1914. Serial No. 822,956.

*To all whom it may concern:*

Be it known that I, ALFRED W. JOHNSON, a citizen of the United States, residing at Chicago, in the county of Cook and State of Illinois, have invented new and useful Improvements in Fruit-Pickers, of which the following is a specification.

The present invention relates to devices for picking fruit from trees, and the primary object of the invention is to construct an article of this character which shall be simple, cheap and effective in operation, and whereby the fruit may be directed through a flexible chute to within a suitable receptacle arranged upon the staff or handle of the structure, and removed therefrom by the operator without danger of bruising or damaging the fruit.

Another object of the invention is to provide a device of this character which shall be made up of a number of similar sections, each of which being securely but removably connected, whereby any number of sections may be employed in accordance with the height of the tree from which the fruit is to be picked.

Another object of the invention is the provision of a picker which is formed from a single strand of wire, and embodies a rounded portion or mouth whereby the same may be inserted over the fruit, and rearwardly extending contacting arms which engage with the stems of the fruit to remove the same from the branches of a tree to allow the fruit to gravitate through a chute secured to the picker or fruit remover.

With the above and other objects in view, the improvement resides in the construction, combination and arrangement of parts set forth in the following specification and falling within the scope of the appended claims.

Figure 4:
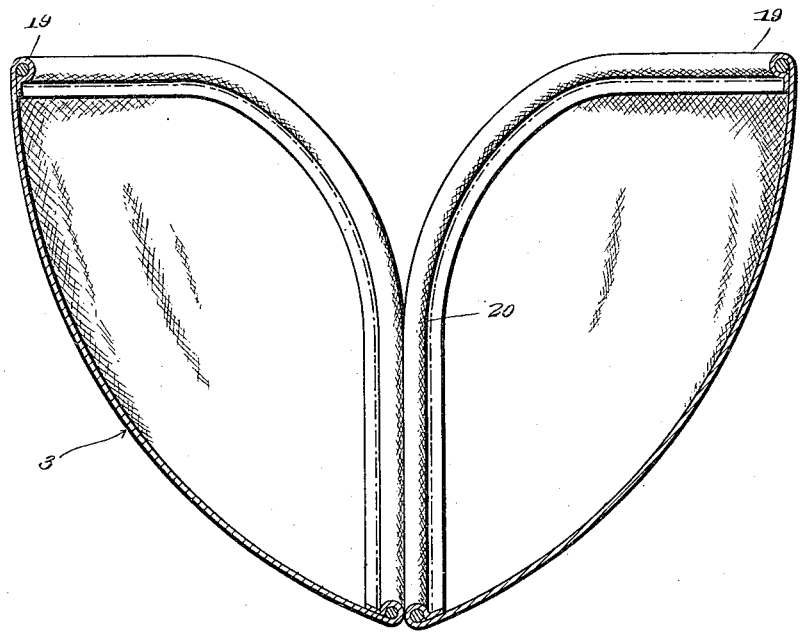
Figure 6:
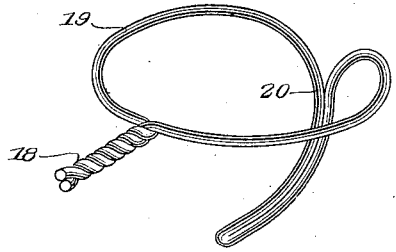
Figure 7:
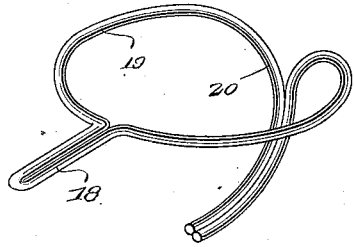

In the drawings: Figure 1 is a perspective view of a fruit picker constructed in accordance with the present invention, Fig. 2 is a detail vertical transverse sectional view taken through the chute and pocket provided upon the lower section of the handle or staff, Fig. 3 is an enlarged sectional view through two of the sections of the chute showing the manner in which the said sections are removably connected and in which the said sections are secured to the staff, Fig. 4 is a transverse sectional view taken through the picker member of the device and the portion of the flexible chute secured thereto, Fig. 5 is a vertical sectional view on the line 5—5 of Fig. 1, Fig. 6 is a perspective view of the frame of the picker or severing member, and Fig. 7 is a similar view of a modified form of the picker or severing member.

Referring now to the drawings in detail, the numeral 1 designates the staff or handle of the device, 2 the chute or conveyer which is attached to the handle, and 3 the gathering member or picker which provides the mouth for the chute.

The staff 1 is made of any desired number of sections, each being of an equal length and each of the said members has its lower end provided with an extending sleeve 4 which is adapted to receive therein the ferrule 5 provided upon the upper end of the adjacent staff section. The sleeve is provided with a transverse opening 6, and the ferrule is likewise provided with a similar opening through which partially extends a spring pressed button 7, and the button of the ferrule is adapted to project through and engage the wall of the opening 6 when the two sections of the staff are assembled. The lower section of the staff comprises what I will term a handle and which is designated by the numeral 8, and this handle has one of its ends provided with a ferrule 5 having the spring pressed button 7 which engages with the opening 6 in the lowest section of the staff proper.

The chute 2 is constructed of some suitable textile material, such as canvas, duck, or the like, and the said chute is also made up of a plurality of sections, one for each of the sections of the staff. Each of the sections is in the form of a tube, and is connected to the staff at the juncture and if desired, by the means which secures the ferrule 5 upon the staff as well to the lower end of the sleeve of each of the staff sections. Each of the sections at its point of connection with the sleeve of the staff is preferably provided with a reinforcing band 9, and the said section extends a suitable distance below the band. This extending portion which may be designated by the numeral 10, is adapted to be received within the upper end or mouth of the chute section to which it is connected, and each of the chute sections, preferably diametrically opposite the point at which it is connected with the sleeve 4, has secured upon its band 9, a strap 11, the said strap being provided with a metallic socket member 12 which is adapted to engage a ball headed member 13 arranged upon the outer face of the co-acting section, the ball and socket member providing a detachable clasp for securing the sections of the chute.

The section of the chute upon the lowermost member of the staff has two diametrically opposed longitudinal slits, and the extensions 14 there formed are curved into approximately semi-circular form. These extensions 14 fit into the open end of the basket 15 which is made of canvas or other flexible material and which is closed at its opposite end. The basket is fastened in any suitable manner to the staff 8, and is secured to the chute at a point diametrically opposite the staff. The tube being made of flexible material, the apron formed on the end, may be removed from the basket providing an opening for the removal of the fruit.

The top section of the staff is provided with a sleeve 16, and the said section, from its outer end, is formed with a centrally arranged longitudinally extending rounded depression 17, the same providing a pocket for the end 18 of a wire gatherer or fruit picker 3. This member, from its said end 18, is rounded outwardly in opposite directions, as indicated by the numerals 19, the upper and inturned ends of the said rounded sides 19 being curved inwardly and rearwardly, as at 20, until the strands of wire contact, thus providing the upper portion of the sides or that portion which forms, what I will term, the face of the gatherer, with a flaring entrance mouth so that the fruit may pass to within the face, and the stem of the fruit be guided to within the entrance mouth and contacted by the frictionally engaging strands of wire and thus severed from the tree and delivered to the chute. The converging strands, from the mouth of the device, are rounded rearwardly and downwardly, the same terminating opposite but a slight distance above the juncture of the rounded sides 19 with the end 18 of the strands of wire forming the gatherer. If desired, the strands, for a distance above the ends, may be spaced a slight distance from each other, the said distance, however, being not sufficient to permit of the fruit passing therethrough. This is desirable when the stems of the fruit are of sufficient length and strength as to pass through the contacting portion at the mouth of the picker, so that an outward movement of the device will cause the rear arms of the picker to be forced against the fruit and so dislodge the same from the stem or from the branch of the tree.

The chute section, for the upper end of the staff 1, has its upper end shaped to conform to the shape of the resilient wire gatherer and is brought over the said metal picker and stitched at what may be termed the inner face of the picker so that the outer or contacting face of the picker has a cloth facing which will prevent the damaging of the fruit when the same is being gathered. The gatherer or picker 3 is constructed of resilient wire, as stated, and of a single strand for the structure in the preferred form of the device and the end members of the wire forming the portion 18 thereof and being twisted or bent around each other before being inserted within the depression 17, but in Fig. 7 of the drawings, the ends of the strand formed at the outer portion of the picker and at the upper section of the chute which is stitched around the said ends provides the means for retaining the ends against separation.

From the above description, taken in connection with the accompanying drawing, the simplicity of the device as well as the advantages thereof will, it is thought, be perfectly apparent to those skilled in the art to which such invention appertains without further detailed description.

The metal or wire picker is preferably wrapped in soft felt before the canvas is stitched thereto, so that the fruit will not be injured thereby.

Having thus described the invention, what I claim is:

1. A fruit gatherer including a staff and a flexible chute connected with the staff, the staff being made of sections, each of the sections having one of its ends provided with a sleeve having a lateral opening, its opposite end provided with a spring pressed button adapted to be received within the opening and the said ends inserted within the sleeve of the adjacent section, the chute being also made of sections having both of its ends connected with a section of the staff, the lower portion of each of the sections of the chute being provided with a reinforcing band, and an apron extending beyond the band, said apron adapted to be received within the mouth of the adjacent section, a ball and socket clasp connection for the sections, the upper section having a rounded reinforced mouth arranged in a plane with and extending from the end of the upper staff section, the sides of the mouth converging inwardly at the top of said chute and contacts approximately centrally of the longitudinal axial plane of the section.

2. A fruit gatherer including a staff and a flexible chute secured upon the staff, a basket of flexible material connected with the handle and with the lower end of the chute, the said basket having opposite rounded sides, the lower portion of the chute having extensions forming aprons which close the sides of the basket, and a metallic picker member secured to the staff and to the upper end of the chute.

In testimony whereof I affix my signature in presence of two witnesses.

ALFRED W. JOHNSON.

Witnesses:
 GEO. BIDLACK,
 MINNIE L. McCALL.

Copies of this patent may be obtained for five cents each, by addressing the "Commissioner of Patents, Washington, D. C."